S. W. Valentine,
Pruning Implement.

No. 92,235.  Patented July 6, 1869.

Witnesses.  
Samuel P. Newell  
Enos B. Ives

Inventor.  
Saml. W. Valentine  
by Theo. G. Ellis  
Attorney

United States Patent Office.

SAMUEL W. VALENTINE, OF BRISTOL, CONNECTICUT.

Letters Patent No. 92,235, dated July 6, 1869.

IMPROVEMENT IN FRUIT-PICKERS.

The Schedule referred to in these Letters Patent and making part of the same.

*To all whom it may concern:*

Be it known that I, SAMUEL W. VALENTINE, of Bristol, in the county of Hartford, and State of Connecticut, have invented certain new and useful Improvements in Fruit-Pickers; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My invention consists in attaching a knife or cutter to the side of one of the jaws of an ordinary spring-pliers, in such a manner as to cut the stem of the fruit at the same time that it is held by the jaws, and prevented from falling; and also in the form given to the jaws to prevent the stem from breaking off on the side opposite the knife, while the fruit is passed into a suitable receptacle.

A is an ordinary pliers, furnished with a spring, $s$, to keep the jaws open.

To one of the jaws, $j$, is attached the knife $k$, which is held by the screws $c\ c$, in such a manner that it can be easily removed for sharpening.

The edge of the knife $k$ is made acute, and not like a shears, which cuts by crushing the fibres between its edges.

Figure 1:
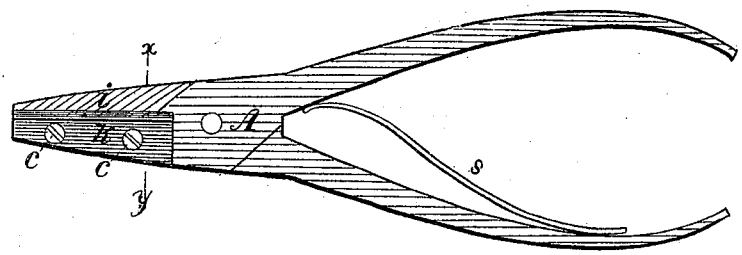
Figure 1 is a side view of my improved fruit-picker.
Figure 2:
Figure 2 is a-top or edge view of the same.
Figure 3:
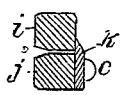
Figure 3 is a cross-section of the jaws and knife, through the line $x\ y$, fig. 1.

The faces of the jaws $i$ and $j$ are bevelled off for about one-quarter of their width on the side opposite the knife, in order to prevent the stem from breaking over the sharp corner of the face of the jaw. (See fig. 3.)

The jaws $i$ and $j$ are also so constructed as not to quite come together, but to leave a small space so as not to crush off the stem of the fruit when too much force is used on the handles of the pliers.

The operation of my invention is as follows:

The picker is held in the hand, with the cutter or knife $k$ uppermost, and used in the manner of an ordinary pliers to take hold of the stem of the fruit.

The jaws $i$ and $j$ grasp the stem at the same time that the knife severs it above the jaws, leaving it held in the pliers for removal to the proper receptacle.

On relieving the pressure of the hand, the jaws open under the influence of the spring $s$, and the stem is released.

The advantages of my invention are, that the use of the pliers is less fatiguing to the hand than the shears commonly used, which blister and injure the thumb and finger introduced into the rings, in consequence of the necessary side pressure; that the knife can be readily detached for sharpening, and easily replaced; and that the stem is severed, by the sharp cutting-edge of the knife, with much less force applied to the handles, than when a shears is used.

Claim.

What I claim as my invention, and desire to secure by Letters Patent, is—

The combination of the knife $k$ with the bevelled jaws $i$ and $j$, substantially as and for the purpose specified.

SAML. W. VALENTINE.

Witnesses:
SAMUEL P. NEWELL,
ENOS B. IVES.